United States Patent [19]

Zimmerly

[11] 4,305,349

[45] Dec. 15, 1981

[54] INTERNAL COMBUSTION ENGINE

[76] Inventor: Harold L. Zimmerly, 6047 No. Muscatel, San Gabriel, Calif. 91775

[21] Appl. No.: 64,039

[22] Filed: Aug. 6, 1979

[51] Int. Cl.³ .................. F02B 25/08; F02B 25/10
[52] U.S. Cl. ...................... 123/51 BB; 123/56 BB; 123/51 R; 123/51 B
[58] Field of Search ............... 123/51 BB, 51 R, 51 B, 123/56 BB

[56] References Cited
U.S. PATENT DOCUMENTS 1,736,639  11/1929  Szydlowski ............... 123/51 BB
2,067,049   1/1937  Goldberg .
2,500,823   3/1950  Hickey .

FOREIGN PATENT DOCUMENTS 202720  8/1923  United Kingdom ........... 123/51 BB

*Primary Examiner*—Ronald B. Cox
*Attorney, Agent, or Firm*—Christie, Parker & Hale

[57]  ABSTRACT

An air control valve (20, 21) is coupled to the minimum volume region of each cylinder (11, 12) in an internal combustion engine. The open interval of the valves during each engine cycle is controlled responsive to the throttle (FIG. 2) to equalize the air-fuel ratio. The clearance of the pistons is also adjusted responsive to the throttle (FIGS. 3A and 4A) to equalize the compression pressure during engine operation. Specifically, in an engine with two cylinders each having opposing pistons, the coupling systems between the piston rods and the crankshaft exhibit diagonal symmetry (FIG. 1).

14 Claims, 6 Drawing Figures

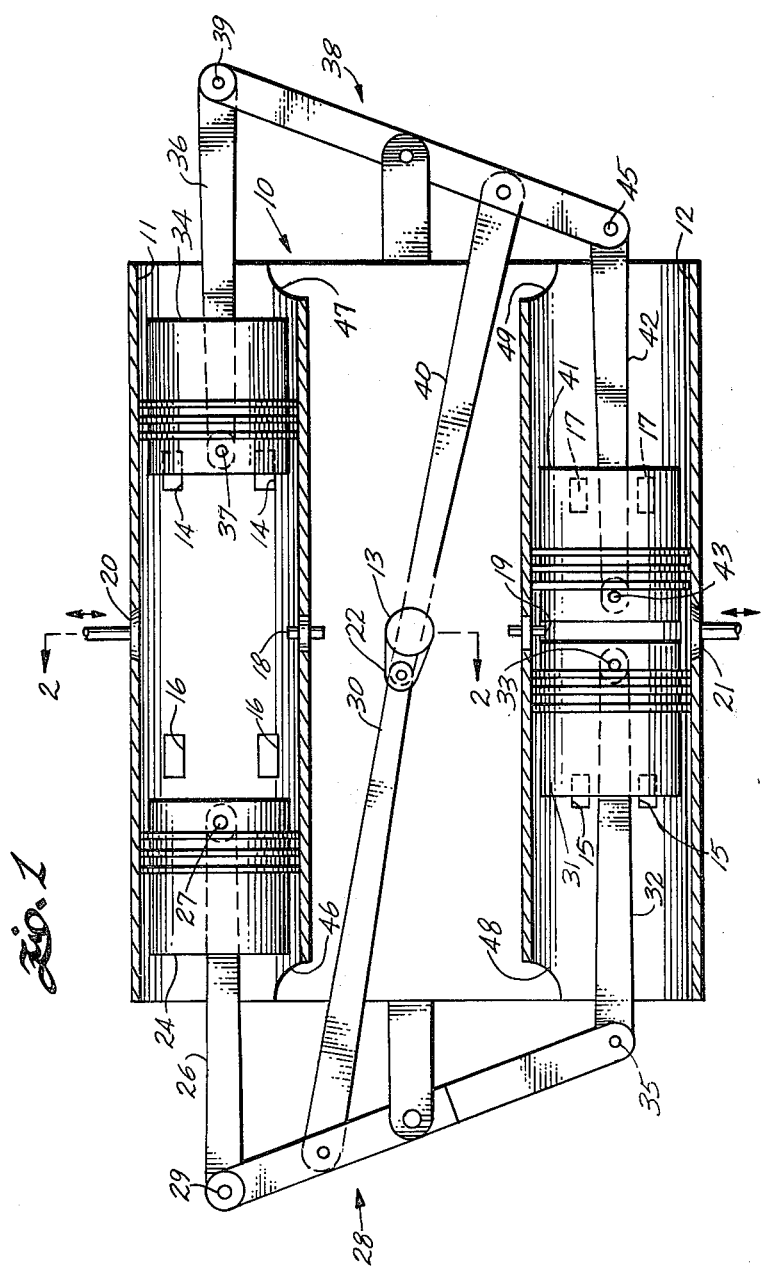

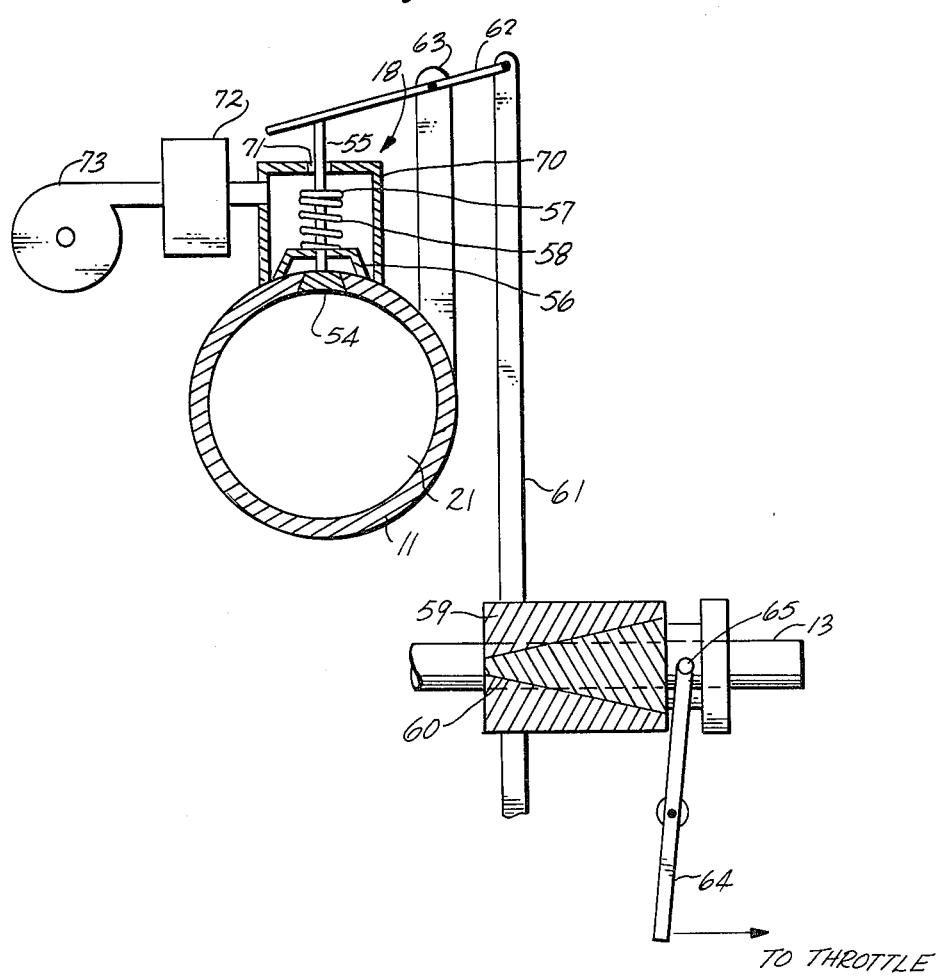

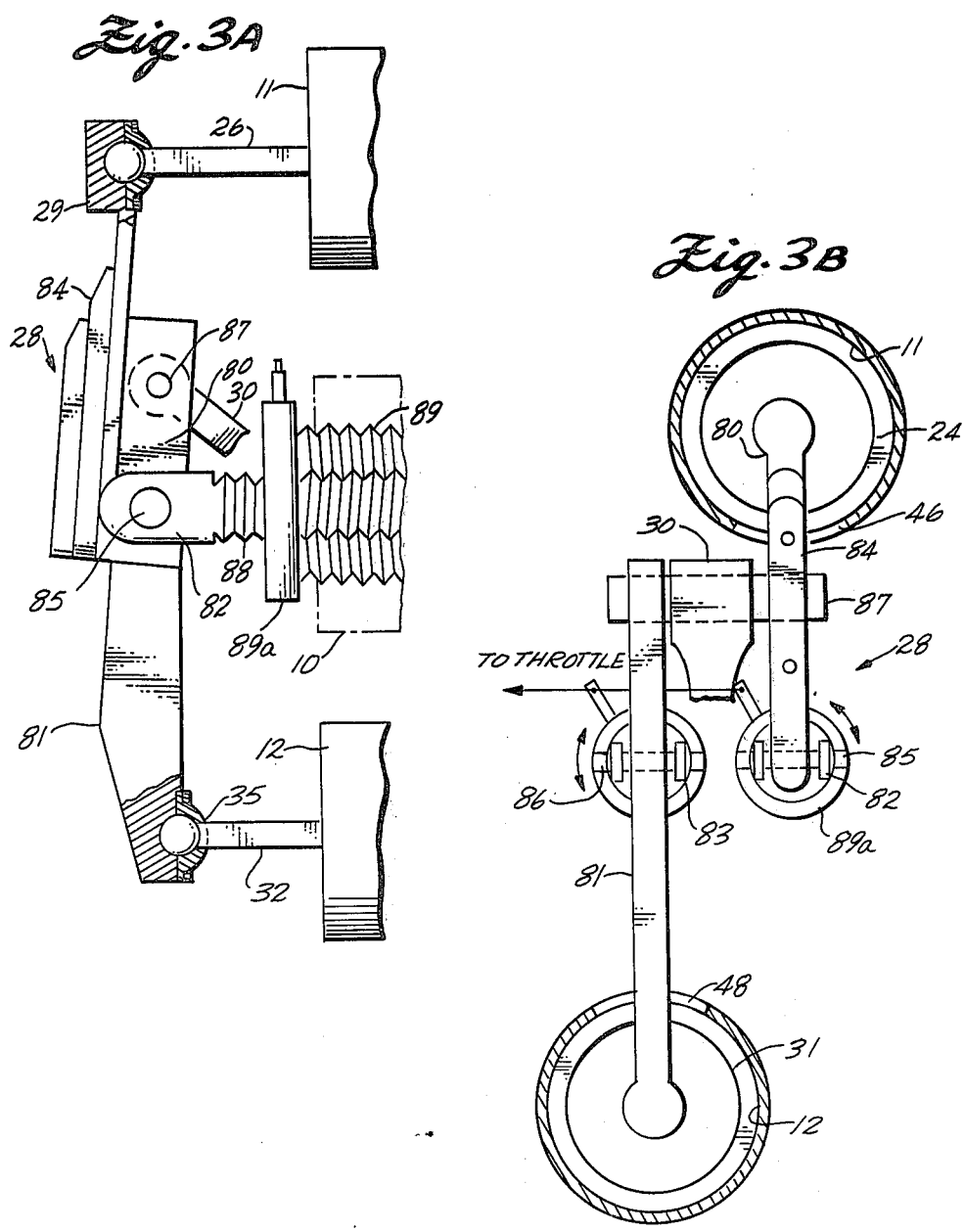

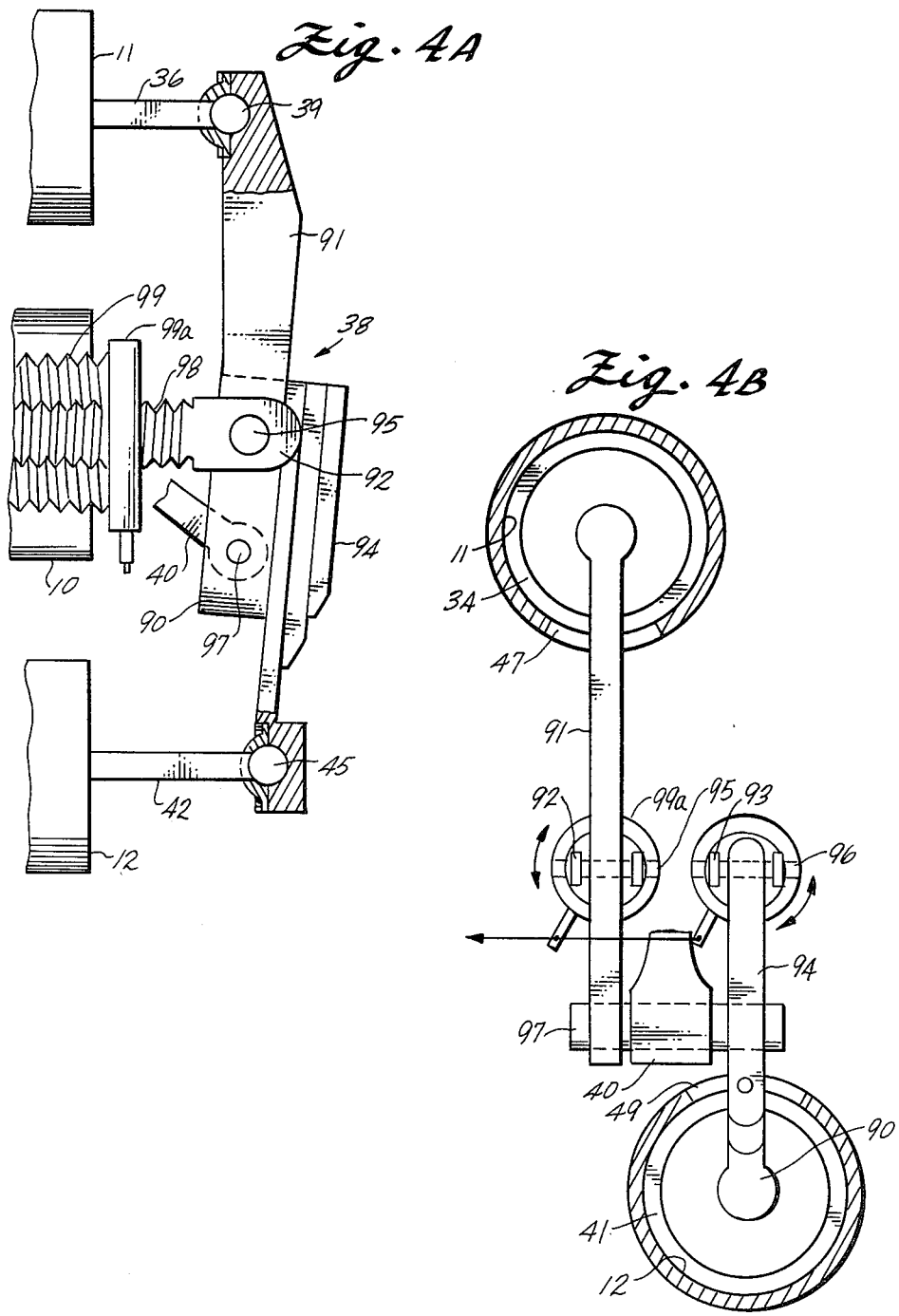

INTERNAL COMBUSTION ENGINE

BACKGROUND OF THE INVENTION

This invention relates to internal combustion engines and, more particularly, to improvements in their efficiency, including size and weight reduction and equalization of the air-fuel ratio.

Although it is desirable from the point of view of engine efficiency and fuel conservation to maintain a uniform air-fuel ratio in an internal combustion engine over the full range of operating conditions, this is difficult to achieve in practice. In a carbureted engine, fuel is fed to the throat of a venturi through which intake air passes prior to entering the cylinders; the fuel flow rate is determined by the air flow rate through the venturi, which in turn is controlled by a butterfly valve in response to the throttle. In a fuel injection engine, the fuel is fed directly into the cylinders through injectors; the fuel control rate is controlled by the fuel pressure and/or injection interval in response to sensors of engine parameters, including engine speed.

One common type of internal combustion engine has one or more cylinders each with a pair of opposing pistons, i.e., the pistons alternatively move together and apart during operation. Piston rods extending from the ends of the cylinder are connected by rocker arms to a crankshaft that is driven by the operation of the engine. The same amount of air is always taken in regardless of the engine speed, although less air is required at low speed per cycle. This unnecessarily uses engine power for air compression, thereby leading to inefficiency.

SUMMARY OF THE INVENTION

One feature of the invention is an air control valve coupled to the minimum volume region of each cylinder in an internal combustion engine. The valve is opened during part of each engine cycle. The time interval in which the valve is open during each engine cycle is controlled responsive to the throttle to equalize the air-fuel ratio. Thus, as the throttle is opened so more fuel is provided, the valve also provides more air, and vice versa.

Another feature of the invention, which is most advantageously employed with the air control valve described above, is adjustment of the clearance of the pistons in an internal combustion engine responsive to the throttle to equalize the compression pressure during engine operation. In the case of an opposing piston engine, the rocker arm pivots are adjusted to change the minimum spacing between pistons in each cylinder.

Another feature of the invention is an internal combustion engine with two cylinders each having opposing pistons, and coupling systems between the piston rods and the crankshaft that exhibit diagonal symmetry. Specifically, a first long rocker arm and a first short rocker arm at one end of the cylinders are connected between the piston rods of the cylinders at the one end and the crankshaft. A second long rocker arm and a second short rocker arm at the other end of the cylinders are connected between the piston rods of the cylinders at the other end and the crankshaft. The rocker arms are pivotally supported. The crankshaft connections lie between the pivotal supports of the short rocker arms and the piston rod connections, while the pivotal supports of the long rocker arms lie between the crankshaft connections and the piston rod connections. Preferably, the short rocker arms are connected by springs to the respective piston rods to relieve excess pressure buildup, and the facing portions of the cylinders are slotted at each end for clearance of the crankshaft connecting linkages.

BRIEF DESCRIPTION OF THE DRAWINGS

The features of a specific embodiment of the best mode contemplated of carrying out the invention are illustrated in the drawings, in which:

FIG. 1 is a side schematic view of an internal combustion engine with two cylinders having opposing pistons, illustrating the principles of the invention;

FIG. 2 is an end view of one of the cylinders showing in detail the air control valve and the mechanism for determining its open interval.

FIGS. 3A and 3B are respectively a more detailed side view and end view of the coupling system between the piston rods on the left end of the cylinders and the crankshaft; and FIGS. 4A and 4B are respectively a more detailed side view and end view of the coupling system between the piston rods on the right end of the cylinders and the crankshaft.

DETAILED DESCRIPTION OF THE SPECIFIC EMBODIMENT

The invention is illustrated in a two-stroke, fuel injection, combustion ignition engine. In FIG. 1, an opposing piston internal combustion engine has a crankcase 10 in which are bored cylinders 11 and 12. Cylinders 11 and 12 are aligned with parallel axes. A crankshaft 13, which lies between cylinders 11 and 12, is supported by bearings, not shown, to rotate about an axis perpendicular to the axes of cylinders 11 and 12. The axes of cylinders 11 and 12 are offset laterally from each other, i.e., they lie on opposite sides of a plane perpendicular to the axis of rotation of crankshaft 13. Cylinder 11 has a plurality of air intake ports 14 and cylinder 12 has a plurality of air intake ports 15, both of which are connected to an intake manifold, not shown. Air is fed into the intake manifold from the blower in conventional fashion. Cylinder 11 has a plurality of exhaust ports 16 and cylinder 12 has a plurality of exhaust ports 17, both connected to an exhaust manifold, not shown. Ports 14 and 15 are closer to the ends of the cylinders than ports 16 and 17. Fuel is fed into cylinders 11 and 12 by injectors 18 and 19, respectively, in conventional fashion in response to the engine throttle. In accordance with the invention, air control valves 20 and 21 are coupled to cylinders 11 and 12, respectively. The construction and operation of air control valves 20 and 21 are explained in more detail below in connection with FIG. 2. Cylinder 11 has opposing pistons 24 and 34 that move together and apart during engine operation. One end of a piston rod 26 is connected to piston 24 by a ball joint 27, and the other end of rod 26 extends from the left end of cylinder 11, where it is connected to a coupling system 28 described below in connection with FIGS. 3A and 3B by a ball joint 29, to maintain alignment of piston rod 26. Coupling system 28 is connected by a drive linkage 30 to a throw 22 of crankshaft 13. Cylinder 12 has opposing pistons 31 and 41 that move apart and together during engine operation 180° out of phase with pistons 24 and 34. One end of a piston rod 32 is connected by a ball joint 33 to piston 31, and the other end of rod 32 extends from the left end of cylinder 12, where it is connected to coupling system 28 by a ball joint 35.

One end of a piston rod 36 is connected to piston 34 by a ball joint 37, and the other end of rod 36 extends from the right end of cylinder 11, where it is connected to a coupling system 38 described below in connection with FIGS. 4A and 4B by a ball joint 39. Coupling system 38 is connected by a drive linkage 40 to throw 22. One end of a piston rod 42 is connected by a ball joint 43 to piston 41, and the other end of rod 42 extends from the right end of cylinder 12, where it is connected to coupling system 38 by a ball joint 45. Crankcase 10 is appropriately shaped to permit rotation of crankshaft 13 and reciprocation of drive linkages 30 and 40. Arcuate slots 46 and 47 are formed in the portions of the respective ends of cylinder 11 facing crankshaft 13 for clearance of coupling system 28. Similarly, arcuate slots 48 and 49 are formed in the portions of the respective ends of cylinder 12 facing crankshaft 13 for clearance of coupling system 38. Slots 46 through 49 permit coupling systems 28 and 38 to be positioned closer to crankshaft 13, thereby reducing the size and weight of the engine.

As shown in detail in FIG. 2 for air control valve 18, the air control valves could be constructed in a fashion similar to a conventional inlet or exhaust valve in a carbureted, four stroke engine. Specifically, a plug 54 fits in a valve seat formed in the side wall of cylinder 11 when the valve is closed. Plug 54 is driven into cylinder 11 to open the valve by a valve stem 55, one end of which is attached to plug 54. Valve stem 55 is kept in alignment by a guide 56. An annular spring keeper 57 is secured to stem 55. A compression spring 58 is positioned between guide 56 and spring keeper 57 to urge plug 54 upwardly as viewed in FIG. 2, thereby seating plug 54 and normally closing the air control valve. An air control valve cam 59 is mounted on crankshaft 13 by means of a key and keyway not shown so that cam 59 can slide back and forth on crankshaft 13. Cam 59 is cylindrical in shape with a tapered lobe 60 that protrudes radially from the cylindrical surface. One end of a cam follower 61, which is supported for axial movement by means not shown, rides on the surface of cam 59. The other end of cam follower 61 is attached to one end of a rocker arm 62. The other end of rocker arm 62 rides on the end of valve stem 55. The center of rocker arm 62 is pivotally supported by a bracket 63, which is secured to cylinder 11. Spring 58, acting through stem 55 and rocker arm 62, urges cam follower 61 into contact with the surface of cam 59. As crankshaft 13 rotates, the air control valve is closed while the end of cam follower 61 rides on the cylindrical surface, and is open while it rides on lobe 60 because lobe 60 forces plug 54 to open in opposition to spring 58. The air control valve opens once during each revolution of crankshaft 13. At full speed, it opens at the start of exhaust, i.e., as the exhaust ports (16, 17) are uncovered by the pistons (24,41) and closes when the intake ports (14, 15) close. At slow speed, it opens sooner to prevent vacuum formation at the end of the combustion pressure and closes later to let air escape during the compression stroke. The percentage of each cycle of rotation of crankshaft 13 during which the valve is open depends upon the axial position of cam 59. This position is changed by a pivot arm 64 in response to the engine throttle. One end of pivot arm 64 is attached to cam 59 by a connecting pin 65, and the other end of pivot arm 64 is connected by schematically represented linkages to the engine throttle. The middle of pivot arm 64 is pivotally supported. As the throttle setting is increased, cam 59 translates to the right as viewed in FIG. 2, and the open time interval of the air control valve becomes smaller so that more air remains in the cylinder during the compression stroke. As the throttle setting is decreased, cam 59 moves to the left as viewed in FIG. 2, and the open time interval of the air control valve becomes larger so less air remains in the cylinder during compression. Generally, more fuel is injected into the cylinders when the throttle setting is increased, and vice versa, so that the described operation of the air control valve increases and reduces the air to be mixed with this fuel accordingly to equalize the air-fuel ratio. The air control valve is enclosed in an airtight bonnet 70 mounted on cylinder 11. Stem 55 passes through a seal 71 to reach rocker arm 62. A blower 73, which could be the engine intake air blower, supplies air to an air storage tank 72. Tank 72 is connected to the interior of bonnet 70.

As shown in FIGS. 3A and 3B, coupling system 28 comprises a short rocker arm 80, a long rocker arm 81, and support yokes 82 and 83. Short rocker arm 80 is connected by a spring 84, which is bolted to rocker arm 80, and ball joint 29 to piston rod 26, and is connected by a ball joint 85 to support yoke 82. Long rocker arm 81 is connected by ball joint 35 to piston rod 32 and is connected by a ball joint 86 to support yoke 83. A connecting pin 87 joins the free end of long rocker arm 81 and the middle of short rocker arm 80 to drive linkage 30. As shown for support yoke 82, each support yoke has a threaded shank 88 that fits in a threaded bore within a threaded cylinder 89. Threaded cylinder 89, in turn, fits in a threaded bore of crankcase 10. Cylinder 89 has a flange 89a connected by linkages to the engine throttle. Shank 88 has left-hand threads and cylinder 89 has right-hand threads. The shank and cylinder associated with yoke 83 are threaded oppositely to those of yoke 82. When the throttle turns flange 89a to the left as viewed in FIG. 3B to reduce the engine speed, yoke 82 moves away from crankcase 10 and yoke 83 moves toward crankcase 10 to reduce the clearance between opposing pistons, and vice versa.

As shown in FIGS. 4A and 4B, coupling system 38 comprises a short rocker arm 90, a long rocker arm 91, and support yokes 92 and 93. Short rocker arm 90 is connected by a spring 94, which is bolted to rocker arm 90, and ball joint 45 to piston rod 42, and is connected by a pivot pin 96 to support yoke 93. Long rocker arm 91 is connected by ball joint 39 to piston rod 36 and is connected by a pivot pin 95 to support yoke 92. A connecting pin 97 joins the free end of long rocker arm 91, and the middle of short rocker arm 90 to drive linkage 40. As shown for support yoke 92, each support yoke has a threaded shank 98 that fits in a threaded bore within a threaded cylinder 99. Threaded cylinder 99, in turn, fits in a threaded bore of crankcase 10. Cylinder 99 has a flange 99a connected by linkages to the engine throttle. Shank 98 has right-hand threads and cylinder 99 has left-hand threads. The shank and cylinder associated with yoke 93 are threaded oppositely to those of yoke 92. When the throttle turns flange 99a to the left as viewed in FIG. 3B to increase the engine speed, yoke 92 moves away from crankcase 10 and yoke 93 moves toward crankcase 10 to increase the clearance between opposing pistons, and vice versa.

As the throttle setting and the quantity of air compressed in the cylinders are changed, the clearance of the opposing pistons, i.e., their minimum spacing, is changed accordingly to equalize the compression pressure. Thus, as the throttle setting and the quantity of compressed air increase, the clearance increases accordingly to prevent excessive compression pressure, and vice versa.

It should be noted that coupling systems 28 and 38 exhibit diagonal symmetry, i.e., diagonal pistons of cylinders 11 and 12, namely, pistons 24 and 41, are connected to short rocker arms 80 and 90, while the remaining diagonal pistons of cylinders 11 and 12, namely, pistons 31 and 34, are connected to long rocker arms 81 and 91. The drive linkage (30, 40) is connected to each short rocker arm (80, 90) between the piston connection (29, 45), and the pivotal connection (85, 96), while the pivotal connection (86, 95) of each long rocker arm (81, 91) is positioned between the piston rod connection (35, 39) and the pivotal connection (87, 97).

Springs 84 and 94 serve to relieve excess pressure buildup within cylinders 11 and 12, respectively, after ignition. Use of these springs permits a size and weight reduction of parts of the engine.

It should be noted they are located in the portion of the coupling system between the pistons (24, 41) covering and uncovering the exhaust ports (16, 17) and crankshaft 13, preferably as shown between the short rocker arms (80, 90) and the piston rods (26, 42). However, the springs would serve their pressure relief function if located anywhere between the crankshaft and the pistons.

The described embodiment of the invention is considered to be preferred and illustrative of the inventive concept. The scope of the invention is not to be restricted to such embodiment. Various and numerous other arrangements may be devised by one skilled in the art without departing from the spirit and scope of this invention. For example, some features of the invention can be practiced in four-stroke, carbureted, or single piston per cylinder engines.

What is claimed is:

1. An internal combustion engine comprising:
   a cylinder having opposed pistons with rods extending from opposite ends of the cylinder;
   a crankshaft rotatably supported about an axis transverse to the cylinder;
   a long rocker arm at one end of the cylinder;
   first means for connecting the long rocker arm to the piston rod at the one end of the cylinder;
   first means for pivotally supporting the long rocker arm;
   first means for connecting the long rocker arm to the crankshaft, the first pivotal support means lying between the first crankshaft connecting means and the first rod connecting means;
   a short rocker arm at the other end of the cylinder;
   second means for connecting the short rocker arm to the piston rod at the other end of the cylinder;
   second means for pivotally supporting the short rocker arm;
   second means for connecting the short rocker arm to the crankshaft, the second crankshaft connecting means lying between the second pivotal support means and the second rod connecting means;
   a throttle to adjust engine speed during operation; and
   means responsive to the throttle for moving both pivotal support means in a direction parallel to the cylinder so as to change the clearance between the opposed pistons during engine operation.

2. The engine of claim 1, in which the second connecting means include a spring between the short rocker arm and the piston rod to which it is connected.

3. The engine of claim 1, additionally comprising an air control valve at the center of the cylinder, means for opening the air control valve during part of each engine cycle, and means responsive to the throttle for controlling the time interval in which the air control valve is opened during each engine cycle to equalize the air-fuel ratio.

4. The engine of claim 3, additionally comprising a blower and means for connecting the blower to the air control valve to supply air to the cylinder.

5. The engine of claim 1, additionally comprising exhaust port means covered and uncovered by one of the pistons and a spring between the crankshaft and the piston that covers and uncovers the exhaust port means.

6. The engine of claim 1, in which the portion of the cylinder facing the crankshaft is slotted at each end for clearance of the crankshaft connecting means.

7. An internal combustion engine comprising:
   a first cylinder having opposed pistons with rods extending from opposite ends of the first cylinder;
   a second cylinder having opposed pistons with rods extending from opposite ends of the second cylinder, the second cylinder being parallel to the first cylinder; a crankshaft lying between the cylinders;
   a first long rocker arm and a first short rocker arm at one end of the cylinders;
   means for connecting the first long and short rocker arms to the piston rods of the first and second cylinders, respectively, at the one end;
   means for pivotally supporting each of the first long and short rocker arms;
   means for connecting each of the first long and short rocker arms to the crankshaft;
   a second long rocker arm and a second short rocker arm at the other end of the cylinders;
   means for connecting the first long and short rocker arms to the piston rods of the first and second cylinders, respectively, at the other end;
   means for pivotally supporting each of the second long and short rocker arms;
   means for connecting each of the second long and short rocker arms to the crankshaft,
   the crankshaft connecting means lying between the pivotal support means of the short rocker arms and the rod connecting means, and
   the pivotal support means of the long rocker arms lying between the crankshaft connecting means and the rod connecting means;
   a throttle for adjusting engine speed during operation;
   first and second air control valves at the center of the first and second cylinders, respectively;
   means for opening the air control valves during part of each engine cycle; and
   means responsive to the throttle for controlling the time interval in which the air control valves are open during each engine cycle to equalize the air-fuel ratio during engine operation.

8. The engine of claim 7, in which the connecting means include a spring between one of the first rocker arms and the piston rod to which it is connected and a spring between one of the second rocker arms and the piston rod to which it is connected.

9. The engine of claim 8, in which the one first rocker arm is the first short rocker arm and the one second rocker arm is the second short rocker arm.

10. The engine of claim 7, additionally comprising means responsive to the throttle for moving the pivotal support means in a direction parallel to the first and second cylinders so as to change the clearance between the opposing pistons.

11. The engine of claim 7, in which the facing portions of the first and second cylinders are slotted at each end for clearance of the crankshaft connecting means.

12. The engine of claim 7, in which the crankshaft connecting means each comprise a linkage and a pin connecting the linkage to the long and short rocker arms on one end of the cylinders.

13. An internal combustion engine comprising:
a cylinder having opposed pistons with rods extending from opposite ends of the cylinder;
a crankshaft rotatably supported about an axis transverse to the cylinder;
a long rocker arm at one end of the cylinder;
first means for connecting the long rocker arm to the piston rod at the one end of the cylinder;
first means for pivotally supporting the long rocker arm;
first means for connecting the long rocker arm to the crankshaft, the first pivotal support means lying between the first crankshaft connecting means and the first rod connecting means;
a short rocker arm at the other end of the cylinder;
second means for connecting the short rocker arm to the piston rod at the other end of the cylinder;
second means for pivotally supporting the short rocker arm; and
second means for connecting the short rocker arm to the crankshaft, the second connecting means including a spring between the short rocker arm and the piston rod to which it is connected, the second crankshaft connecting means lying between the second pivotal support means and the second rod connecting means.

14. An internal combustion engine comprising:
a cylinder having opposed pistons with rods extending from opposite ends of the cylinder;
a crankshaft rotatably supported about an axis transverse to the cylinder;
a long rocker arm at one end of the cylinder;
first means for connecting the long rocker arm to the piston rod at the one end of the cylinder;
first means for pivotally supporting the long rocker arm;
first means for connecting the long rocker arm to the crankshaft, the first pivotal support means lying between the first crankshaft connecting means and the first rod connecting means;
a short rocker arm at the other end of the cylinder;
second means for connecting the short rocker arm to the piston arm at the other end of the cylinder;
second means for pivotally supporting the short rocker arm;
second means for connecting the short rocker arm to the crankshaft, the second crankshaft connecting means lying between the second pivotal support means and the second rod connecting means;
a throttle for adjusting engine speed during operation;
an air control valve at the center of the cylinder;
means for opening the air control valve during part of each engine cycle; and
means responsive to the throttle for controlling the time interval in which the air control valve is opened during each engine cycle to equalize the air fuel ratio during engine operation.

* * * * *